US012788016B2

(12) United States Patent
Chavan et al.

(10) Patent No.: US 12,788,016 B2
(45) Date of Patent: Nov. 10, 2026

(54) STABLE COMPOSITIONS OF FUNGICIDAL COMPOUNDS

(71) Applicant: UPL LTD, Mumbai (IN)

(72) Inventors: Popat Ganesh Chavan, Mumbai (IN); Dev Varta Mukherjee, Mumbai (IN); Rajan Ramakant Shirsat, Mumbai (IN)

(73) Assignee: UPL LTD, Mumbai (IN)

( * ) Notice: Subject to any disclaimer, the term of this patent is extended or adjusted under 35 U.S.C. 154(b) by 817 days.

(21) Appl. No.: 17/773,950

(22) PCT Filed: Oct. 30, 2020

(86) PCT No.: PCT/IB2020/060193
§ 371 (c)(1),
(2) Date: May 3, 2022

(87) PCT Pub. No.: WO2021/099866
PCT Pub. Date: May 27, 2021

(65) Prior Publication Data

US 2022/0361501 A1 Nov. 17, 2022

(30) Foreign Application Priority Data

Nov. 19, 2019 (IN) ............................ 201921047062

(51) Int. Cl.

| | |
|---|---|
| ***A01N 47/14*** | (2006.01) |
| ***A01N 25/30*** | (2006.01) |
| ***A01N 33/24*** | (2006.01) |
| ***A01N 37/50*** | (2006.01) |
| ***A01N 43/54*** | (2006.01) |
| ***A01N 43/653*** | (2006.01) |
| ***A01P 3/00*** | (2006.01) |

(52) U.S. Cl.
CPC ............ *A01N 47/14* (2013.01); *A01N 25/30* (2013.01); *A01N 33/24* (2013.01); *A01N 37/50* (2013.01); *A01N 43/54* (2013.01); *A01N 43/653* (2013.01); *A01P 3/00* (2021.08); *A01N 2300/00* (2013.01)

(58) Field of Classification Search
CPC ........ A01N 47/14; A01N 25/30; A01N 33/24; A01N 43/54; A01N 43/653; A01N 37/50; A01N 2300/00; A01P 3/00
See application file for complete search history.

(56) References Cited

U.S. PATENT DOCUMENTS

2017/0332637 A1* 11/2017 Oliveira ................ A01N 43/54

FOREIGN PATENT DOCUMENTS

| | | | | |
|---|---|---|---|---|
| CN | 102258039 A * | 11/2011 | | |
| EP | 0788740 A1 | 8/1997 | | |
| WO | 2012042316 A1 | 4/2012 | | |
| WO | WO-2018025192 A1 * | 2/2018 | ............ | A01N 43/54 |
| WO | 2019186359 A1 | 10/2019 | | |

OTHER PUBLICATIONS

Zhang, W., (CN102258039A), Sterilizing Composition Containing Prothioconazole and Thiocarbamate, 2011, FIT Database, English Translation of CN10258039A, 15 pages. (Year: 2011).*
International Search Report and Written Opinion for International Application PCT/IB2020/060193; International Filing Date: Oct. 30, 2020; Date of Mailing: Jan. 28, 2021; 9 pages.

* cited by examiner

*Primary Examiner* — Ali Soroush
*Assistant Examiner* — Andriae M Holt
(74) *Attorney, Agent, or Firm* — CANTOR COLBURN LLP

(57) ABSTRACT

A stable composition comprising azole fungicides, dithiocarbamates and a blend of high and low molecular weight formaldehyde-aromatic sulfonic acid condensates is disclosed. Further a method of controlling unwanted pests comprising applying an effective amount of stable fungicidal compositions according to the present invention to the pests or to their habitat is disclosed.

4 Claims, No Drawings

STABLE COMPOSITIONS OF FUNGICIDAL COMPOUNDS

CROSS REFERENCE TO RELATED APPLICATIONS

This application is a National Stage application of PCT/IB2020/060193, filed Oct. 30, 2020, which claims the benefit of priority to Indian patent application Ser. No. 20/192,1047062, filed Nov. 19, 2019, both of which are incorporated by reference in their entirety herein.

TECHNICAL FIELD OF THE INVENTION

The present invention provides stable fungicidal compositions. The present invention relates to stable fungicidal compositions comprising azole fungicides, dithiocarbamates and a blend of high and low molecular weight formaldehyde-aromatic sulfonic acid condensates.

BACKGROUND OF THE PRESENT INVENTION

Fungi are one of the major causes for crop loss worldwide and hence fungicides are considered as an important class of pesticides. Fungicides are pesticides that kill or prevent the growth of fungi and their spores. Fungicides are specific types of pesticides that are used widely to control fungal diseases by inhibiting or killing the fungus that is causing the diseases. They can be used to control fungi including rusts, mildews and blights. Fungicides work in a variety of ways, depending on their mode of action, but most of them damage fungal cell membranes or interfere with energy production within fungal cells.

Fungicides of various classes have been successful in controlling most major diseases in growing crops. Inorganic complex compounds such as dithiocarbamates were one of the earliest chemicals developed for control of fungal diseases. These chemicals affect several biochemical processes in the fungi so are called multi-site fungicides. However, these chemicals are contact fungicides and are non-systemic. They simply protect the crop plant from disease infection.

Systemic fungicides have been developed since the 1960s and are vastly used ever since. Even though many of such chemicals are curative and eradicant they are site specific and affects only a single biochemical pathway. The combination of such multi-site fungicide and a systemic fungicide is a widely acceptable method of adequate control of various fungicidal diseases considering the resistance that has been developed by certain fungi against these single site fungicides over a period.

It is well known that for bringing out the maximum effectiveness of fungicidal chemicals, they must be formulated with agrochemically acceptable excipients.

These excipients enhance the activity of the fungicides as well as modify the physical characteristics of the formulated products. To formulate a product containing 2 or more active ingredients is a real challenge as it is difficult to predict problems such as compatibilities and stability of the formulated product.

Strobilurins are a group of chemical compounds used in agriculture as fungicides.

They are part of the larger group of Qol inhibitors, which act to inhibit the respiratory chain at the level of Complex III. Strobilurins are mostly contact fungicides with a long half time as they are absorbed into the cuticle and not transported any further. A commonly used strobilurin fungicide is Azoxystrobin. It is a fungicide with protectant, curative, eradicant, translaminar and systemic properties. Azoxystrobin controls the following pathogens, at application rates between 100 to 375 g/ha: *Erysiphe graminis, Puccinia* spp., *Leptosphaeria nodorum, Septoria tritici* and *Pyrenophora teres* on temperate cereals; *Pyricularia oryzae* and *Rhizoctonia solani* on rice; *Plasmopara viticola* and *Uncinula necator* on vines; *Sphaerotheca fuliginea* and *Pseudoperonospora cubensis* on cucurbitaceae; *Phytophthora infestans* and *Alternaria solani* on potato and tomato; *Mycosphaerella arachidis, Rhizoctonia solani* and *Sclerotium rolfsii* on peanut; *Monilinia* spp. and *Cladosporium carpophilum* on peach; *Pythium* spp. and *Rhizoctonia solani* on turf; *Mycosphaerella* spp. on banana; *Cladosporium caryigenum* on pecan; *Elsinoe fawcettii, Colletotrichum* spp. and *Guignardia citricarpa* on citrus; *Colletotrichum* spp. and *Hemileia vastatrix* on coffee.

The conazole fungicides represent a large group of compounds widely used agriculturally for the protection of crop plants. Prothioconazole being a conazole fungicide is a systemic fungicide with protective, curative, eradicative and long-lasting activity. Prothioconazole is used for control of diseases such as eyespot (*Pseudocercosporella herpotrichoides*), *Fusarium* ear blight (*Fusarium* spp., *Microdochium nivale*), leaf blotch diseases (*Septoria tritici, Leptosphaeria nodorum, Pyrenophora* spp., *Rhynchosporium secalis,* etc.), rust (*Puccinia* spp.) and powdery mildew (*Blumeria graminis*), by foliar application, in wheat, barley and other crops. As a seed dressing, it is used for control of *Ustilago* spp., *Tilletia* spp., *Fusarium* spp. and *Microdochium nivale.*

Mancozeb is a broad-spectrum, non-systemic fungicide with protective action. Mancozeb is used for control of many fungal diseases in a wide range of field crops, fruit, nuts, vegetables, ornamentals, etc. More frequent uses include control of early and late blights (*Phytophthora infestans* and *Alternaria solani*) of potatoes and tomatoes; downy mildew (*Plasmopara viticola*) and black rot (*Guignardia bidwellii*) of vines; downy mildew (*Pseudoperonospora cubensis*) of cucurbits; scab (*Venturia inaequalis*) of apples; Sigatoka (*Mycosphaerella* spp.) of bananas; and melanose (*Diaporthe citri*) of citrus.

Inventors of the present invention noted physical incompatibility while formulating a mixture of an azole fungicide and other active ingredients as a formulation. It is well understood that these azole fungicides are considered difficult molecules to formulate. Physical incompatibility causes the formation of lumps or gels. The active ingredients do not disperse properly and settle out of suspension. Such formulations suffer a drop in suspensibility and therefore lead to poor performance. Incompatibility can also cause the formation of foams, stratification in the tank and colour changes.

The present invention aims to resolve the complications mentioned above and to provide stable and effective formulations of azole fungicide with dithiocarbamate fungicides and other active ingredients.

Objects of the Present Invention

It is an object of the present invention to provide a stable fungicidal composition comprising an azole fungicide.

Another object of the present invention is to provide a stable fungicidal composition comprising an azole fungicide, a dithiocarbamate, at least one co-pesticide.

Yet another object of the present invention is to provide a method of controlling unwanted pests said method comprising applying an effective amount of stable fungicidal compositions according to the present invention to the pests or to their habitat.

Summary of the Present Invention

The present invention provides a stable fungicidal composition comprising an azole fungicide and a blend of high and low molecular weight formaldehyde-aromatic sulfonic acid condensates, derivatives or salts thereof.

The present invention provides a stable fungicidal composition comprising an azole fungicide and a blend of high and low molecular weight formaldehyde-aromatic sulfonic acid condensates, derivatives or salts thereof wherein said blend contains not more than 15% by weight of a high molecular weight condensate.

The present invention provides a stable fungicidal composition comprising an azole fungicide, a dithiocarbamate and a blend of high and low molecular weight formaldehyde-aromatic sulfonic acid condensates, derivatives or salts thereof.

The present invention provides a stable fungicidal composition comprising an azole fungicide, a dithiocarbamate and a blend of high and low molecular weight formaldehyde-aromatic sulfonic acid condensates, derivatives or salts thereof wherein said blend contains not more than 15% by weight of a high molecular weight condensate.

Compositions according to the present invention further comprise at least one co-pesticide.

Compositions according to the present invention further comprise at least one strobilurin fungicide.

The present invention further provides a method of controlling unwanted pests said method comprising applying an effective amount of stable fungicidal compositions according to the present invention to the pests or to their habitat.

DETAILED DESCRIPTION

Azole fungicides are difficult classes of fungicides to formulate. It has been found by the present inventors that stable compositions of azole compounds could be prepared in the presence of a surfactant that is a blend of high and low molecular weight formaldehyde-aromatic sulfonic acid condensates, derivatives or salts thereof.

There are many known surfactants in the class of formaldehyde-aromatic sulfonic acid condensates, derivatives or salts thereof. However, not all of them are a blend of high and low molecular weight condensates, and thus not all these surfactants provide stable compositions comprising azole fungicides. It was found that stable azole fungicide compositions could be prepared only in the presence of formaldehyde-aromatic sulfonic acid condensates, derivatives or salts thereof which were a blend of high and low molecular weight formaldehyde-aromatic sulfonic acid condensates. More preferably, stable compositions were prepared wherein the blend contained not more than 15% by weight of a high molecular weight condensate. It was further found that such stable compositions could not be prepared when the formaldehyde-aromatic sulfonic acid condensate surfactant was not a blend of high and low molecular weight condensates, derivatives or salts thereof.

Accordingly, the present invention provides stable compositions comprising an azole fungicide alone or in combination with other active ingredients. Inventors of the present invention observed physical variability during the development of formulation of azoles in various type of formulations.

Surprisingly, inventors of the present invention developed stable formulations or compositions comprising azole fungicides by the use of a blend of high and low molecular weight formaldehyde-aromatic sulfonic acid condensate, derivatives or salts thereof.

Thus, the present invention provides a stable fungicidal composition comprising an azole fungicide and a blend of high and low molecular weight formaldehyde-aromatic sulfonic acid condensate, derivatives or salts thereof.

The present invention provides a stable fungicidal composition comprising an azole fungicide and a blend of high and low molecular weight formaldehyde-aromatic sulfonic acid condensate, derivatives or salts thereof wherein said blend contains not more than 15% by weight of a high molecular weight condensate.

The present invention provides a stable fungicidal composition comprising an azole fungicide, a dithiocarbamate and a blend of high and low molecular weight formaldehyde-aromatic sulfonic acid condensate, derivatives or salts thereof.

The present invention provides a stable fungicidal composition comprising an azole fungicide, a dithiocarbamate and a blend of high and low molecular weight formaldehyde-aromatic sulfonic acid condensate, derivatives or salts thereof wherein said blend contains not more than 15% by weight of a high molecular weight condensate.

The present invention provides a stable fungicidal composition comprising an azole fungicide, a dithiocarbamate and a blend of high and low molecular weight formaldehyde-aromatic sulfonic acid condensate, derivatives or salts thereof wherein said blend contains not more than 15% by weight of a high molecular weight condensate.

With respect to the present invention, the term "high molecular weight condensate" refers to a polymer condensate having numbered average molecular weight more than 5,000. Particularly the numbered average molecular weight refers to a range from 5000 to 50,000.

With respect to the present invention, the term "low molecular weight condensate" refers to a polymer condensate having numbered average molecular weight 5,000 or less. Particularly the numbered average molecular weight refers to a range from 5000 to 500.

With respect to the present invention, the term "blend of high and low molecular weight condensate" refers to a polymer condensate characterized by percentages of a condensate with a molecular weight of more than 5,000 being not more than 15% by weight of all the condensates.

With respect to the present invention, the term "blend of high and low molecular weight condensate" refers to a polymer condensate characterized by percentages of a condensate with a molecular weight of 5,000 or less being not more than 90% by weight of all the condensates.

With respect to the present invention, the term "blend of high and low molecular weight condensate" refers to a polymer condensate that is a mixture of low and high molecular weight condensate wherein the major component of the mixture up to about 90% is having a molecular weight $<5000$ and minor component of the mixture up to about 15% is having a molecular weight $>5000$.

In an embodiment the composition comprises blend of high and low molecular weight condensate in amount from about 0.01% to about 30% by weight of the formulation.

Preferably the composition comprises blend of high and low molecular weight condensate in amount from about 1% to about 20% by weight of the formulation.

In an embodiment the present invention provides a stable fungicidal composition comprising an azole fungicide, a dithiocarbamate and a blend of high and low molecular weight formaldehyde-aromatic sulfonic acid condensate, derivatives or salts thereof wherein said blend contains not more than 15% by weight of a high molecular weight condensate.

In an embodiment the azole fungicide is selected from the group comprising pyrazole carboxamide fungicides, benzimidazole fungicides, benzothiazole fungicides, conazole fungicides selected from imidazoles and triazoles and oxazole fungicides.

In a preferred embodiment the azole fungicide is selected from the conazole fungicides.

In an embodiment the conazole fungicide is selected from azaconazole, bromuconazole, cyproconazole, diclobutrazol, difenoconazole, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, ipfentrifluconazole, mefentrifluconazole, metconazole, myclobutanil, penconazole, propiconazole, fluconazole, prothioconazole, quinconazole, simeconazole, tebuconazole, tetraconazole, triadimefon, triadimenol, triticonazole, uniconazole and uniconazole-P.

In an embodiment the preferred conazole fungicide is prothioconazole.

In an embodiment the composition comprises prothioconazole in an amount from about 0.01% to about 50% by weight of the composition.

In another embodiment the dithiocarbamate fungicide is selected from amobam, asomate, azithiram, carbamorph, cufraneb, cuprobam, disulfiram, ferba m metam, nabam, tecoram, thiram, urbacide, ziram, dazomet, etem, milneb, mancopper, mancozeb, maneb, metiram, polycarbamate, propineb and zineb.

In an embodiment the preferred dithiocarbamate fungicide is selected from ziram, mancopper, mancozeb, maneb, metiram, polycarbamate, propineb and zineb.

In an embodiment the preferred dithiocarbamate fungicide is mancozeb.

In an embodiment the composition comprises mancozeb in an amount from about 10% to about 99% by weight of the composition.

In a preferred embodiment the composition comprises mancozeb in an amount from about 30% to about 90% by weight of the composition.

In an embodiment the present invention provides a composition comprising prothioconazole, mancozeb and a blend of high and low molecular weight formaldehyde-aromatic sulfonic acid condensate, derivatives or salts thereof wherein said blend contains not more than 15% by weight of a high molecular weight condensate.

In an embodiment the fungicidal compositions according to the present invention further comprises at least once co-pesticide.

Thus in an embodiment the present invention provides a stable fungicidal composition comprising an azole fungicide, a dithiocarbamate, at least one co-pesticide and a blend of high and low molecular weight formaldehyde-aromatic sulfonic acid condensate, derivatives or salts thereof wherein said blend contains not more than 15% by weight of a high molecular weight condensate.

In an embodiment the co-pesticide is selected but not limited to herbicide, insecticide, insect growth regulator, nematicide, termiticide, molluscicide, bactericide, insect repellent, animal repellent, antimicrobial, fungicide, disinfectant and sanitizer.

In a preferred embodiment the co-pesticide is a fungicide.

In an embodiment the co-pesticide is fungicide selected from but not limited to demethylation inhibitor, quinone outside inhibitor, succinate dehydrogenase inhibitor and quinone inside inhibitor.

In another embodiment, the co-pesticide is quinone outside inhibitor.

In another embodiment, quinone outside inhibitor is selected from strobilurin fungicides.

Thus in an embodiment the present invention provides a stable fungicidal composition comprising an azole fungicide, a dithiocarbamate, a strobilurin fungicide and a blend of high and low molecular weight formaldehyde-aromatic sulfonic acid condensate, derivatives or salts thereof wherein said blend contains not more than 15% by weight of a high molecular weight condensate.

In an embodiment, the strobilurin fungicide is selected from but not limited to azoxystrobin, kresoxim-methyl, picoxystrobin, pyraclostrobin, fluoxastrobin and trifloxystrobin.

In an embodiment the preferred strobilurin fungicide is selected from azoxystrobin, trifloxystrobin and pyraclostrobin.

In an embodiment the composition comprises the strobilurin fungicide in an amount from about 0.01% to about 30% by weight of the composition.

In a preferred the composition comprises the strobilurin fungicide in an amount from about 1% to about 20% by weight of the composition.

In an embodiment the present invention provides a composition comprising prothioconazole, mancozeb, trilfoxystrobin and a blend of high and low molecular weight formaldehyde-aromatic sulfonic acid condensate, derivatives or salts thereof wherein said blend contains not more than 15% by weight of a high molecular weight condensate.

In an embodiment the present invention provides a composition comprising prothioconazole, mancozeb, azoxystrobin and a blend of high and low molecular weight formaldehyde-aromatic sulfonic acid condensate, derivatives or salts thereof wherein said blend contains not more than 15% by weight of a high molecular weight condensate.

The compositions according to the present invention may be formulated as emulsifiable concentrates, wettable powders, water dispersible granules, suspension concentrate, microemulsion, capsule suspensions, granules and the like.

In an embodiment the compositions according to the present invention may be formulated as solid compositions.

The processes for preparing solid compositions according to present invention are not limited.

In an embodiment the solid compositions according to present invention are prepared as follows:

a) blending an azole fungicide, optionally other excipients and a blend of high and low molecular weight formaldehyde-aromatic sulfonic acid condensate, derivatives or salts thereof wherein said blend contains not more than 15% by weight of a high molecular weight condensate in a mixture to form a homogenous mixture,
b) preparing a slurry of the mixture with a diluent and
c) wet milling of the slurry followed by granulation to get the composition In an embodiment the solid compositions according to present invention are prepared as follows:

a) Blending an azole fungicide, optionally other excipients, optionally a further co-pesticide and a blend of high and low molecular weight formaldehyde-aromatic sulfonic acid condensate, derivatives or salts thereof wherein said blend contains not more than 15% by weight of a high molecular weight condensate in a mixture to form a homogenous mixture, b) Preparing a slurry of the mixture a diluent and c) wet milling of the slurry d) optionally adding further co-pesticide followed by granulation to get the composition.

In an embodiment the solid compositions according to present invention are prepared as follows:

a) Blending an azole fungicide, a dithiocarbamte fungicide, optionally other excipients, optionally a further co-pesticide and a blend of high and low molecular weight formaldehyde-aromatic sulfonic acid condensate, derivatives or salts thereof wherein said blend contains not more than 15% by weight of a high molecular weight condensate in a mixture to form a homogenous mixture, b) Preparing a slurry of the mixture a diluent and c) wet milling of the slurry followed by granulation to get the composition.

In an embodiment the process for preparing the slurry is not limited.

In another embodiment the diluent is water.

In an embodiment the process of milling and granulation is not limited.

Appropriate granulating processes are all conventional processes described in granulating technology for example spray drying, fluidized bed granulation, agglomeration, pan granulation and extrusion granulation.

The stable fungicidal compositions according to the present invention may optionally include other agrochemically acceptable excipients. Examples are surfactants such as dispersing agents, wetting agents, emulsifiers, suspension agents, defoamers, penetrants, fertilizers, rheology modifiers or thickeners, inerts and combinations thereof.

In an embodiment the suitable surfactants include all common anionic and non-ionic substances.

In an embodiment the suitable surfactants are selected from but not limited to ethoxylated nonylphenols, polyalkylene glycolether of linear or branched alcohols, reaction products of alkyl phenols with ethylene oxide and/or propylene oxide, reaction products of fatty acid amines with ethylene oxide and/or propylene oxide, furthermore fatty acid esters, alkyl sulfonates, alkyl sulphates, alkyl ethersulphates, alkyl etherphosphates, arylsulphate, ethoxylated arylalkylphenols, e.g. tristyryl-phenol-ethoxylates, furthermore ethoxylated and propoxylated arylalkylphenols like sulphated or phosphated arylalkylphenol-ethoxylates and -ethoxy- and propoxylates, lignosulphonates, gelatine, gum arabic, phospholipides, starch, hydrophobic modified starch and cellulose derivatives, in particular cellulose ester and cellulose ether, further polyvinyl alcohol, polyvinyl acetate, polyvinyl pyrrolidone, polyacrylic acid, polymethacrylic acid and co-polymerisates of (meth)acrylic acid and (meth) acrylic acid esters, and further co-polymerisates of methacrylic acid and methacrylic acid esters, and mono alkyl esters of long chain fatty acids. The esters of fatty acids comprise one or more acids selected from saturated or unsaturated acids containing from about 10 to about 24 carbon atoms. Suitable esters of fatty acids are those with linear or branched mono or polyhydric alcohols having from about 1 to about 8 carbon atoms.

In an embodiment the suitable surfactants are selected from lignosulfonates, aryl, alkyl or arylalkyl sulfonates and polymer condensates such as aromatic sulfonic acid condensates.

In an embodiment the composition according to the present invention further comprises sticking and binding agents such as sugar, lignin and their derivatives, polyvinyl pyrrolidone, starch, natural gum such as xanthan gum, guar gum, carboxy methyl cellulose and their derivatives, precipitated silica, pH modifiers, suspending agents, spray droplet modifiers, pigments, antioxidants, UV protectants, compatibilizing agents, antifoam agents, sequestering agents, neutralizing agents, corrosion inhibitors, dyes, odorants, micronutrients, emollients, lubricants, and the like.

The present invention further provides a method of controlling unwanted pests said method comprising applying an effective amount of stable fungicidal compositions according to the present invention to the pests or to their habitat.

In an embodiment, the stable compositions of the present invention are used as fungicide.

In an embodiment, the formulations according to the present invention can be used for pest control on plants, plant parts, seeds, seedlings, or on soil.

In another embodiment, there is provided a method of controlling unwanted fungi, said method comprising applying a fungicidally effective amount of a stable fungicidal composition comprising an azole fungicide, a dithiocarbamate, and a blend of high and low molecular weight formaldehyde-aromatic sulfonic acid condensate, derivatives or salts thereof wherein said blend contains not more than 15% by weight of a high molecular weight condensate.

In another embodiment, there is provided a method of controlling unwanted fungi, said method comprising applying a fungicidally effective amount of a stable fungicidal composition comprising an azole fungicide, a dithiocarbamate, at least one co-pesticide and a blend of high and low molecular weight formaldehyde-aromatic sulfonic acid condensate, derivatives or salts thereof wherein said blend contains not more than 15% by weight of a high molecular weight condensate.

In an embodiment the azole fungicide is prothioconazole.

In an embodiment the dithiocarbamate fungicide is mancozeb.

In an embodiment the co-pesticide is another fungicide.

In another embodiment the co-pesticide is a strobilurin fungicide.

In an embodiment the strobilurin fungicide is selected from azoxystrobin, trifloxystrobin or fluoxastrobin In another embodiment, there is provided a method of controlling unwanted fungi, said method comprising applying a fungicidally effective amount of a stable fungicidal composition comprising an azole fungicide, a dithiocarbamate, at least one strobilurin fungicide and a blend of high and low molecular weight formaldehyde-aromatic sulfonic acid condensate, derivatives or salts thereof wherein said blend contains not more than 15% by weight of a high molecular weight condensate.

The instant invention is more specifically explained by examples provided hereinbelow. However, it should be understood that the scope of the present invention is not limited by the examples in any manner. It will be appreciated by any person skilled in this art that the present invention includes the given examples and further can be modified and altered without departing from the novel teachings and advantages of the invention which are intended to be included within the scope of the invention.

EXAMPLES

Example 1

A composition comprising prothioconazole and mancozeb according to the present invention is prepared as follows:

| Ingredients | Quantity (% wt./wt.) |
|---|---|
| Mancozeb (Purity 86%) | 70.90 |
| Prothioconazole (Purity 98%) | 05.40 |
| lignosulfonate | 16.20 |
| Blend of high and low molecular weight formaldehyde-aromatic sulfonic acid condensate | 7.00 |
| defoamer | 0.50 |
| Total | 100.00 |

Process: Pre-weighted quantities of all ingredients were blended in a mixture to form a homogenous mixture. A slurry of the mixture was made with 50 parts of water. Wet milling of the slurry was performed in a bead mill followed by granulation. The granules were dried until the moisture content is less than 2%.

Example 2

A composition comprising prothioconazole, mancozeb and azoxystrobin according to the present invention is prepared as follows:

| Ingredients | Quantity (% wt/wt) |
|---|---|
| Mancozeb | 61.63 |
| Azoxystrobin | 4.28 |
| Prothioconazole | 4.18 |
| Sodium Lauryl sulfate | 22.41 |
| Blend of high and low molecular weight formaldehyde-aromatic sulfonic acid condensate | 6.00 |
| defoamer | 1.50 |
| Total | 100.00 |

The composition was prepared by following the process of example 1.

Example 3

Comparative Example: A composition comprising prothioconazole and mancozeb is prepared as follows:

| Ingredients | Quantity (% wt./wt.) |
|---|---|
| Mancozeb (Purity 86%) | 70.90 |
| Prothioconazole (Purity 98%) | 05.40 |
| lignosulfonate | 16.20 |
| formaldehyde-aromatic sulfonic acid condensate | 7.00 |
| defoamer | 0.50 |
| Total | 100.00 |

The composition was prepared by following the process of example 1

Example 4

Comparative Example: A composition comprising prothioconazole, mancozeb and azoxystrobin is prepared as follows:

| Ingredients | Quantity (% wt/wt) |
|---|---|
| Mancozeb | 61.62 |
| Azoxystrobin | 4.10 |
| Prothioconazole | 4.10 |
| lignosulfonate | 21.18 |
| formaldehyde-aromatic sulfonic acid condensate | 6.00 |
| defoamer | 2.00 |
| Total | 100.00 |

The composition was prepared by following the process of example 1

Example 5

A composition comprising prothioconazole, mancozeb and trifloxystrobin according to the present invention is prepared as follows:

| Sr. No. | Ingredient | Percentage |
|---|---|---|
| 1 | Mancozeb | 62.2 |
| 2 | Prothioconazole | 4.60 |
| 3 | Trifloxystrobin | 3.80 |
| 4 | lignosulfonate | 12.0 |
| 5 | Sodium lauryl sulphate | 3.50 |
| 6 | Blend of high and low molecular weight formaldehyde-aromatic sulfonic acid condensate | 5.00 |
| 7 | Sodium salt of xylene sulphonate 40% | 6.00 |
| 8 | defoamer | 1.50 |
| 9 | Precipitated Silica | 1.50 |

Study of Physical Parameters of a Composition According to the Present Invention Physical parameters of a composition as prepared in Example 1 and 2 were tested and compared with a comparative formulation of Example 3 and 4. Examples 3 and 4 were prepared using formaldehyde-aromatic sulfonic acid condensate which does not contain high molecular weight condensate. The samples were prepared and kept at ambient temperature and at 54° C. for 14 days and 28 days (accelerated haeat stability test). Data recorded is presented in the below tables (Table 1-3).

TABLE1

| | Example 1 | | |
|---|---|---|---|
| Physico-chemical Parameters | Ambient | 14 days AHS | 28 days AHS |
| Active content of Mancozeb (% w/w) | 60.19 | 60.06 | 59.89 |
| Active content Prothioconazole (% w/w) | 5.06 | 5.03 | 4.95 |
| Suspensibility (Gravimetric) | 92.8 | 89.9 | 86.0 |
| We Sieve % w/w Retention | Nil | Nil | Nil |
| Observation | Suspensibility of product maintained | Suspensibility of product maintained in AHS | Suspensibility of product maintained in AHS |

TABLE 2

| Physico-chemical Parameters | Example 3 (comparative) Ambient | 14 days AHS | 28 days AHS |
|---|---|---|---|
| Active content of Mancozeb (% w/w) | 62.50 | 62.09 | 61.50 |
| Active content Prothioconazole (% w/w) | 5.15 | 5.02 | 4.98 |
| Suspensibility (Gravimetric) | 87.29 | 66.07 | 61.58 |
| We Sieve % w/w Retention | Nil | Nil | Nil |
| Observation | Suspensibility of product maintained | Suspensibility of product dropped in AHS | Suspensibility of product dropped in AHS |

TABLE 3

| Physico-chemical Parameters | Example 2 Ambient | 14 days AHS | 28 days AHS |
|---|---|---|---|
| Active content of Mancozeb (% w/w) | 53.39 | 53.12 | 53.06 |
| Active content of Azoxystrobin (% w/w) | 4.03 | 3.9 | 3.8 |
| Active content Prothioconazole (% w/w) | 3.89 | 3.76 | 3.76 |
| Suspensibility (Gravimetric) | 91.26 | 90.5 | 89.0 |
| We Sieve % w/w Retention | 0.10 | 0.11 | 0.12 |
| Persistence Foam (in ml) | 20.00 | 40.0 | 45.0 |
| Observation | Suspensibility of product maintained | Suspensibility of product maintained in AHS | Suspensibility of product maintained in AHS |

TABLE 4

| Physico-chemical Parameters | Example 4 (comparative) Ambient | 14 days AHS | 28 days AHS |
|---|---|---|---|
| Active content of Mancozeb (% w/w) | 53.10 | 52.80 | 52.80 |
| Active content of Azoxystrobin (% w/w) | 4.10 | 4.02 | 4.0 |
| Active content Prothioconazole (% w/w) | 3.95 | 3.85 | 3.80 |
| Suspensibility (Gravimetric) | 79.20 | 64.0 | 58.0 |
| We Sieve % w/w Retention | 0.15 | 0.20 | 0.22 |
| Persistence Foam (in ml) | 50 | 52 | 56 |
| Observation | | Suspensibility dropped in AHS | Suspensibility dropped in AHS |

TABLE 5

| Physico-chemical Parameters | Example 5 Ambient | 14 days AHS | 28 days AHS |
|---|---|---|---|
| Active content of Mancozeb (% w/w) | 53.01 | 52.99 | 52.5 |
| Active content of trifoxystrobin (% w/w) | 3.75 | 3.71 | 3.72 |
| Active content Prothioconazole (% w/w) | 4.35 | 4.32 | 4.31 |
| Suspensibility (Gravimetric) | 91.4 | 88.0 | 86.0 |
| We Sieve % w/w Retention | 0.17 | 0.2 | 0.25 |
| Persistence Foam (in ml) | 10.00 | 12.0 | 15.0 |
| Observation | Suspensibility of product maintained | Suspensibility of product maintained in AHS | Suspensibility of product maintained in AHS |

It has been observed that the compositions according to the present invention lead to stable formulations. The suspensibility of the formulation was observed to be constant while the comparative formulation which does not contain a blend of high and low molecular weight formaldehyde-aromatic sulfonic acid condensate, suffered a drop in suspensibility. This result indicates the advantage of using a blend instead of a polymer condensate not having a blend of high and low molecule weight polymer components. Further it has been noted that the comparative formulation led to the formation of large amount of foam.

Field Trial

A field trial was conducted to study the effect of the inventive compositions (Example 2) on efficacy against Powdery Mildew (Erysiphe cruciferarum) of Mustard (Brassica juncea). A comparative formulation as per Example 3 was also tested to compare the observations. The details of the trial and the results are summarised below:

Material and Methodology

| Sr. No | Particular | Details |
|---|---|---|
| 1 | Crop | Mustard |
| 2 | Date of sowing | 5 November |
| 3 | Date of Treatment application | 8 December |
| 4 | Plot size | 12 m2 (6 m × 2 m) |
| 5 | Experimental Design | CRD |
| 6 | Number of Treatments | 3 (Three) |
| 7 | Number of Replications | 3 (Three) |
| 8 | Sprayer Used | Battery operated Knapsack |
| 9 | Nozzle Type | Hallow Cone |

Treatment Details

| Treatment No | Sample | Formulation Dose (gm/ha) | Time of application |
|---|---|---|---|
| T1 | Example 3 | 1.5 Kg/ha | 30 DAS as prophylactic |
| T2 | Example 2 | 1.5 kg/ha | 30 DAS as prophylactic |
| T3 | Untreated Control | -NA- | -NA- |

Observations

1) Disease Severity %:

Observation of % Disease Severity was recorded on leaves. In each plot total 100 leaves (randomly selected 20 Plants X 5 leaves of each plant) were observed for powdery mildew using revised rating scale of Conn et al. as percent infected area under disease.

Scale (0-9) for rating reaction to Powdery mildew:

| Grade/Scale | Details |
|---|---|
| 0 | No Lesions |
| 1 | Non sporulation pin-point size or small brown necrotic spots, less than 5% leaf are covered by lesions |
| 3 | Small roundish slightly sporulating larger brown necrotic spots, about 1-2 mm in diameter with a distinct margin or yellow halo, 5-10% leaf area covered by lesions |
| 5 | Moderately sporulating, non-coalescing larger brown spots, about 2-4 mm in diameter with distinct margin or yellow halo, 11-25% leaf area covered by the spots |
| 7 | Moderately sporulating, coalescing larger brown spots about 4-5 mm in diameter, 26-50% leaf area covered by the lesions |
| 9 | Profusely sporulating, rapidly coalescing brown to black spots measuring more than 6 mm diameter without margins covering more than 50% leaf area |

Average Disease Severity %=Sum of all disease ratings Total number of ratings*Maximum disease grade All data in percentage were analysed after arc-sin transformation and both actual and transformed value of mean Critical Difference (C.D.) at 0.05 level of significance.

Observations

TABLE 1

Effect of different treatments on Powdery Mildew of Mustard

| Treatment No | % Disease Severity |
|---|---|
| T1 | 16.56 (8.31) |
| T2 | 9.11 (2.64) |
| T3 | 24.37 (17.16) |
| CD (P < 0.05%) | 6.16 |

Figures in the parenthesis are original values, CD: Critical Difference

Conclusion

Among the two treatments T2 recorded the disease severity of 9.11 which is significantly lower than T1 (16.56). This clearly indicated that T2 had more effectively controlled powdery mildew damage than rest of treatments. Thus, it has been proved that the compositions according to the present invention are effective for providing the required fungicidal activity. The composition which does not contain a blend of high and low molecular weight formaldehyde-aromatic sulfonic acid condensate was found to be ineffective for an acceptable fungicidal activity.

The invention claimed is:

1. A stable fungicidal composition comprising prothioconazole, mancozeb, and a blend of high molecular weight and low molecular weight formaldehyde-aromatic sulfonic acid condensate surfactants, or a salt thereof, wherein said blend is present in an amount from 1% to 20% by weight of the composition, and wherein the high molecular weight condensate is a polymer condensate having a numbered average molecular weight more than 5000.

2. The stable fungicidal composition of claim 1, further comprising at least one co-pesticide.

3. The stable fungicidal composition of claim 2, wherein said co-pesticide is a strobilurin fungicide.

4. The stable fungicidal composition of claim 2, wherein said co-pesticide is selected from the group consisting of azoxystrobin, and trifloxystrobin.

* * * * *